Patented Aug. 22, 1944

2,356,190

UNITED STATES PATENT OFFICE 2,356,190

NOVEL ISOMERIZATION PROCESS

Alexis Voorhies, Jr., Baton Rouge, La., assignor to Standard Oil Development Company, a corporation of Delaware No Drawing. Application January 2, 1941, Serial No. 372,842

13 Claims. (Cl. 260—683.5)

The present invention relates to a process of isomerizing normal or straight chain paraffins containing at least four carbon atoms per molecule to produce their corresponding iso or branched chain paraffinic isomers. The invention is applicable to the conversion of branched chain paraffins into the corresponding less highly branched paraffins or into normal or straight chain paraffins. However, from the standpoint of economical usage the production of branched chain paraffins is more desirable at the present time.

It is known that normal paraffins may be isomerized by various catalysts such as, for example, aluminum chloride, aluminum bromide, ferric chloride, zinc chloride, molybdenum trisulfide and the like, with or without the use of promoters such as, for example, the hydrogen halides or water. It is also known that the reaction may be carried out under various conditions to avoid substantial cracking of the feed stocks, the chief process among this class involving the use of elemental or free hydrogen.

The present invention is concerned with the isomerization of the heretofore mentioned paraffinic hydrocarbons in the presence of aluminum halide catalysts which have been found to be promoted not only by the use of small amounts of hydrogen halides but likewise by the use of small amounts of olefins. The exact nature of the catalyst is at present unknown. However, it has been observed that when a small amount of olefins is admixed with a feed stock heretofore customarily employed in isomerization reactions such as, for example, a feed stock comprising essentially normal butane and wherein the catalyst is, for example, solid aluminum chloride, that the olefins when present in small amounts therein tend to gradually liquefy the solid aluminum chloride with the formation presumably of an aluminum chloride-olefin complex which is liquid under the reaction conditions. The presence of small amounts of olefins in the isomerization reaction zone together with the attendant formation of the liquid olefin-aluminum chloride complex has been found to result in increased yields of the desired isomers. As to the exact mechanism by which these increased yields are attained, nothing of any definite nature is known. It may be that the olefin-aluminum chloride complex actually promotes the reaction or it may be that the presence of the olefin tending to gradually liquefy the solid aluminum chloride has a beneficial effect. Suffice it to say that the invention may be practiced by having present in the reaction zone containing solid aluminum chloride and the normal paraffinic reactants small amounts of olefins which are found to undergo complex addition with the solid aluminum chloride catalyst contained therein.

It has been found that the quantities of the olefins based upon the amount of paraffinic hydrocarbon reactants present in the reaction zone at any one time must be kept within narrow limits. Otherwise the desired isomerization reaction has been found to be definitely diminished so far as production of branched chain paraffins is concerned. Definite measurable amounts of either a single olefin or a mixture of olefins up to about 9% by weight based on the hydrocarbons present in the reaction zone at any one time may be employed when the aluminum chloride catalyst concentration is about 15% based on the hydrocarbons. Preferably, however, the olefin should be present in an amount ranging between about 0.25% and about 6%. It has been found that for aluminum chloride catalyst concentrations greater or less than 15% based on hydrocarbons, the preferable upper limit of olefin concentrations is respectively greater or less than 6%. Roughly the mol ratio of olefin to aluminum chloride should not exceed 1:1. For example, with 15% aluminum chloride, the presence of amounts of olefins greater than 9% should definitely be avoided since it has been found previously that large quantities of olefins present in the feed stock of a paraffinic isomerization reaction tend to rapidly decompose the aluminum chloride and to result in a materially lowered yield of isoparaffins from that type of reaction. It was, therefore, unexpected to find that smaller percentages of olefins definitely contributed toward an improved and increased yield of the desired isoparaffins.

Although some olefins are known to be more effective as promoters for the reaction than others, still the promotional activity is not particularly lessened with respect to the suitable selection of one particular olefin over another. In general, however, it has been found that the branched chain olefins such as, for example, isobutylene, are preferred although ethylene, propylene and the normal butenes are nearly as useful in this respect. Mixtures of these olefins may likewise be employed. Thus, for example, the C₄ olefins, namely, the normal butenes and isobutylenes, may be employed in various mixtures in the indicated amounts to carry out the desired process. It is also within the scope of the invention to employ refinery C₄ cuts which contain substantial amounts of normal butane together with any desired amounts of the C₄ olefins and to blend therein sufficient extraneous normal butane or other normal paraffin to give the required paraffin:olefin ratio such that the concentration of olefin therein is below 9%. Likewise, the use of field butanes which have been partially dehydrogenated and blended with the required paraffinic constituents to give the desired paraffin:olefin ratios may be employed.

As feed stocks employed for the isomerization reaction the usual straight chain paraffins containing at least four carbon atoms per molecule may be employed. Thus, for example, normal butane, normal pentane, normal hexane, normal heptane and the like and/or mixtures of two or more of these hydrocarbons or mixtures predominating in these hydrocarbons may be employed. In general the longer straight chain paraffins are less suitable for the process than the lower members of the series because of the increased tendency toward cracking when employing these higher homologues. To some extent this tendency toward cracking may be suppressed by the introduction at superatmospheric pressure of free or elemental hydrogen during the reaction. Usually, it is desirable that the presence of elemental or free hydrogen be kept at a minimum because of the tendency of the olefins to be hydrogenated when contacted with the solid aluminum chloride. However, in cases where the olefin content of the feed stock is higher than desired for effectually promoting the reaction, the presence of hydrogen does tend to increase the isomerization activity because of the tendency of the unduly large amounts of olefins to become hydrogenated during the process.

The reaction conditions are those customarily employed when carrying out paraffinic isomerization reactions in the presence of aluminum chloride or aluminum bromide. The quantity of catalyst employed may range from about 1% to about 150% by weight based on the paraffin maintained in the reaction zone at any one time. The optimum catalyst concentration changes with variation in reaction conditions. Ordinarily lower catalyst concentrations are employed at relatively high temperatures and long reaction times. Under typical operating conditions the amount of catalyst present ranges from about 15% to about 70% by weight. Likewise, if desired, a promoter such as, for example, hydrogen chloride and hydrogen bromide may be employed in an amount ranging between about 2% and about 22% by weight of the hydrocarbon present in the reaction zone at any one time, preferably between about 4% and about 18%. The temperature under which the reaction zone is maintained depends to some extent upon the feed stock employed. Thus, for example, when isomerizing normal butane the reaction zone may very conveniently be maintained between about 60° F. and about 300° F., preferably between 100° F. and 225° F. However, when employing normal pentane as a feed stock, all other reaction conditions remaining the same as in the case of normal butane, the temperature is somewhat lower because of the increased tendency of the normal pentane toward cracking. This temperature is between about 30° F. and about 100° F., preferably between about 40° F. and about 75° F. The reaction may be carried out batchwise or in continuous flow equipment with a contact time of, roughly, between about 0.1 hour and about 20 hours, preferably between about 2 and about 15 hours depending of course upon the other reaction conditions. Naturally where the temperatures are somewhat high and the tendency toward cracking is greater than at the lower temperatures the time of contact is materially lowered and with respect to the use of lower temperatures larger amounts of hydrogen chloride, larger catalyst concentrations, etc., are employed.

The use of superatmospheric pressures is ordinarily desirable since it has been found that mechanically it is much easier to agitate a catalyst in a liquid phase reaction medium than to agitate a catalyst in vapor phase medium, and furthermore, the liquid phase operation is to be preferred from an economical standpoint. This may be accomplished by the use of superatmospheric pressures ranging up to as high as 1000 lbs. gauge. Preferably, however, pressure is maintained by means of the hydrogen chloride or hydrogen bromide or by means of elemental hydrogen if that is employed just sufficient to keep the reactants in the liquid phase under the other reaction conditions obtaining. Single reactors or multiple reactors arranged in parallel or series may be employed. Mechanical means for agitating the contents of these reactors may be motor driven propellers, jets of restricted internal diameter, turbo-mixers and the like or a solid catalyst bed may be employed in a continuous flow system. In general, however, the reactors must be so designed as to accommodate solid catalyst when the reactor is first placed on stream and to provide for the withdrawal of spent catalyst in liquid form since, as heretofore mentioned, the olefin apparently unites with the solid aluminum chloride to form a liquid complex. If desired, the fresh feed may be introduced into the bottom of such a reactor so that it is forced through the liquid complex prior to contacting with the solid aluminum chloride, or if desired the fresh feed may be contacted with solid aluminum chloride first and the liquid complex secondly, as by introducing the fresh feed downwardly through a bed of catalyst contained in a vertical reaction chamber and allowing the feed so contacted with the solid aluminum chloride to then contact the liquid complex which is carried away from time to time into a separate chamber where the feed from the initial chamber is passed through the liquid catalyst layer. Where hydrogen chloride or hydrogen bromide is employed as a promoter, these promoters are recovered from the reactant mixture by fractional distillation and returned to the original reaction zone or they may be employed in other processes. The heavy products coming from the reaction zone are then separated into the desired branched chain paraffins and unreacted reactants by fractional distillation. The unreacted hydrocarbons may then be recycled to the reaction zone as desired.

The process when employed in connection with the heretofore described reactors readily lends itself to a continuous operation wherein the solid aluminum chloride may be continually added to a bed type reaction chamber and the partially degraded liquid olefin-aluminum halide complex is continuously withdrawn from the bottom of that reactor to a separate reaction chamber or withdrawn from the system, as the exigencies of the particular operation require. By such a process it has been found to be unnecessary to shut down any particular bed type catalyst container to remove spent catalyst by reason of the fact that the catalyst upon becoming fully spent is usually in liquid form and may be withdrawn through pipes rather than requiring the opening of manholes for the mechanical removal of spent solid as has been customary in the past. It is to be distinctly understood, however, that the process is applicable to batch type operations and may be so carried out. However, from a purely commercial standpoint it is preferred to employ a continuous process since the greatest economy may be attained in that way.

Not only is a bed type of catalyst mass desirable wherein the solid aluminum chloride comprises 100% of the material composition of the bed, but the invention contemplates the use of various inert carriers upon which is deposited or in which is impregnated aluminum chloride or aluminum bromide so that a greatly increased surface for contact with the normal paraffins is obtained. Thus, for example, activated carbon, pumice, silica gel, alumina gel, Permutite, Sil-O-Cel, Celite, Super Filtrol, and other acid activated clays may be employed as carriers for the aluminum halides. In this way greater contact between the olefin promoter and the aluminum chloride is attained and the aluminum chloride complex is thereby formed faster than would be the case where lumps or granules of solid aluminum chloride were employed exclusively.

In order to more fully describe and disclose the invention, the following examples are given. However, it is to be distinctly understood that these examples are illustrative and are not intended to limit the invention thereto.

All of the following runs were carried out when employing normal butane as a feed stock with the amounts of feed stocks, promoters, etc., being correlated with respect to the amount of catalyst present in the reactor. The amount remained constant at 15% by weight based on the total hydrocarbons contained in the reactor. An autoclave was operated in a batchwise manner and maintained at a temperature of 212° F. The butylenes employed as promoters were contained in a refinery $C_4$ cut which contained 31% of isobutylene, 52% of normal butylene and 17% of normal and iso butanes. This was added in sufficient quantity to the normal butane feed stock to give the indicated percentages of $C_4$ olefins with respect to the total normal butane content of the feed stock. The autoclave was agitated during the entire run and at the end of the run the reacted mixture was fractionated to determine the percentage of isobutane formed and the percentage of normal butane reacted.

Table

| Run No. | Promoter wt. percent $C_4$ olefins based on n-butane feed | Time | Weight percent n-butane reacted | Weight percent isobutane formed |
|---|---|---|---|---|
| 1 | None | 12 | 11.6 | 10.9 |
| 2 | 2 | 12 | 22.0 | 22.0 |
| 3 | 10 | 12 | 0.0 | 0.0 |
| 4 | 2 | 12 | 33.8 | 32.7 |
| 5 | 2 | 12 | 36.7 | 35.6 |
| 6 | 1 | 12 | 38.6 | 37.6 |
| 7 | 0.5 | 12 | 31.9 | 30.6 |
| 8 | 0.2 | 12 | 22.8 | 21.8 |
| 9 | 4 | 6 | 40.2 | 39.9 |
| 10 | None | 6 | 22.3 | 21.9 |
| 11 | 4% HCl | 12 | 40.4 | 39.7 |
| 12 | 2% HCl | 12 | 28.0 | 27.5 |

It is apparent from the above data that from 1 to 4% $C_4$ olefins act as a better promoter for the isomerization of n-butane than does 2 to 4% HCl, the isobutane yields being better than those obtained with 2 to 4% HCl. However, Run 3 indicates that olefins as high as 10% of the normal butane feed are definitely harmful to the isomerization reaction. On the other hand, less than 1% olefins promotes the isomerization but to a lesser extent than 1 to 4% olefins.

Having thus fully described and illustrated the character of the invention, what is claimed as new and useful and desired to be secured by Letters Patent is:

1. A process which comprises isomerizing at least one normal paraffin containing at least four carbon atoms per molecule under isomerization reaction conditions in contact with an aluminum halide adding to the reaction promotional amounts of at least one monoolefin as the sole promoter and recovering isoparaffins from the reacted mixture, said monoolefins being present in less than one mol of olefin per mol of aluminum halide contacted.

2. A process of isomerizing normal butane to isobutane which comprises contacting normal butane containing measurable amounts but less than 9% of at least one butylene as the sole promoter, the percentages being by weight of the normal butane, under isomerization reaction conditions in contact with not less than 15% of its weight of aluminum chloride, and withdrawing from the reaction zone isobutane.

3. The process as in claim 2 wherein the fresh feed is contacted with solid aluminum chloride and with the aluminum chloride complex formed during the reaction prior to recovering isobutane from the reacted mixture.

4. The process as in claim 13 wherein the reaction is carried out in the presence of elemental or free hydrogen.

5. A process which comprises contacting at least one straight chain paraffin containing at least four carbon atoms per molecule, at a temperature between about 30° F. and 400° F. for between about 0.1 hour and about 20 hours in liquid phase with agitation, with between about 1% and about 150% by weight of aluminum chloride, said paraffinic feed stock containing an appreciable amount but less than about one mol of monoolefin as the sole promoter per mol of aluminum halide catalyst, and correlating reactants, catalyst, promoter and the like to effect substantial conversion of straight chain paraffins to isoparaffins.

6. The process as in claim 5 wherein the olefin promoter is propylene.

7. The process as in claim 5 wherein the olefin promoter is a $C_4$ olefinic mixture.

8. A process which comprises isomerizing normal butane at a temperature of about 212° F. for a period between about 6 and about 12 hours in the presence of about 15% by weight of aluminum chloride and in the presence of a promoter constituting between about 1% and about 4% of $C_4$ olefins as the sole promoter, and recovering isobutane from the reacted mixture.

9. A process which comprises isomerizing normal pentane to produce isopentane which comprises contacting normal pentane at a temperature of about 75° F. to about 100° F. in contact with about 15% by weight of aluminum chloride and between about 1% and about 4% of at least one $C_4$ olefin as the sole promoter for between about 2 and about 20 hours in the liquid phase with intensive agitation, and recovering isopentane from the reacted mixture.

10. A process which comprises contacting normal paraffins containing at least four carbon atoms per molecule under isomerization reaction conditions with aluminum chloride and with an olefin-aluminum chloride complex the olefin portion thereof constituting the sole promoter of the reaction.

11. A process as in claim 10 in which the olefin comprises essentially isobutylene.

12. A process as in claim 10 wherein the aluminum chloride is supported by a catalyst carrier and the olefin comprises essentially $C_4$ monoolefins.

13. A process which comprises isomerizing at least one normal paraffin containing at least four carbon atoms per molecule under isomerization reaction conditions, in contact with aluminum chloride, adding to the reaction promotional amounts of at least one monoolefin as the sole promoter and recovering isoparaffins from the reacted mixture, said monoolefins being present in less than one mol of olefin per mol of aluminum chloride contacted.

ALEXIS VOORHIES, Jr.